(12) United States Patent
Joergensen

(10) Patent No.: US 6,393,968 B2
(45) Date of Patent: May 28, 2002

(54) FILTER FOR A FUNNEL FOR A COFFEE MAKING APPARATUS

(75) Inventor: Carsten Joergensen, St. Niklausen (CH)

(73) Assignee: Pi-Design AG, Triengen (CH)

(*) Notice: Subject to any disclaimer, the term of this patent is extended or adjusted under 35 U.S.C. 154(b) by 0 days.

(21) Appl. No.: 09/736,174

(22) Filed: Dec. 15, 2000

(30) Foreign Application Priority Data

Dec. 16, 1999 (DK) .............................................. 1803/99

(51) Int. Cl.[7] .............................................. A47J 31/00
(52) U.S. Cl. .............................. 99/310; 99/303; 99/308
(58) Field of Search ........................... 99/303, 310, 308, 99/302 R, 323, 307; 210/477, 478, 479

(56) References Cited

U.S. PATENT DOCUMENTS

| | | | | |
|---|---|---|---|---|
| 1,978,561 A | * | 10/1934 | Battilani | 99/303 |
| 2,618,218 A | * | 11/1952 | Peters | 99/303 |
| 2,936,696 A | * | 5/1960 | Sorlini | 99/303 |

FOREIGN PATENT DOCUMENTS

| | | | | |
|---|---|---|---|---|
| FR | 797719 | * | 5/1936 | 99/303 |
| GB | 438944 | * | 11/1935 | 99/303 |
| IT | 566708 | * | 9/1957 | 99/303 |

* cited by examiner

*Primary Examiner*—Reginald L. Alexander
(74) *Attorney, Agent, or Firm*—Nath & Associates PLLC; Gary M. Nath; Marvin C. Berkowitz

(57) ABSTRACT

With respect to a filter with a fastening device for a coffee-making apparatus of the type where water is brought to a boil in a closed container, whereupon the water is pressed through a riser pipe into a funnel, where boiling water extracts aromas and flavour from the ground coffee, whereupon the finished coffee beverage is filtered back into the closed container through a filter placed at the outlet of the funnel, where the filter is fastened by means of a fastening device which reaches through the riser pipe, the objective is to to provide a filter where the aroma and flavour of the ground coffee is exploited as well as possible and where the filter offers a comparatively large filter surface for the finished coffee, and where the filter can easily be removed from the funnel and cleaned with a view to further coffee-making. Moreover, the filter must be easily replaceable by dismantling the handle and locking clip and fitting these on a new filter.

Figure 1:
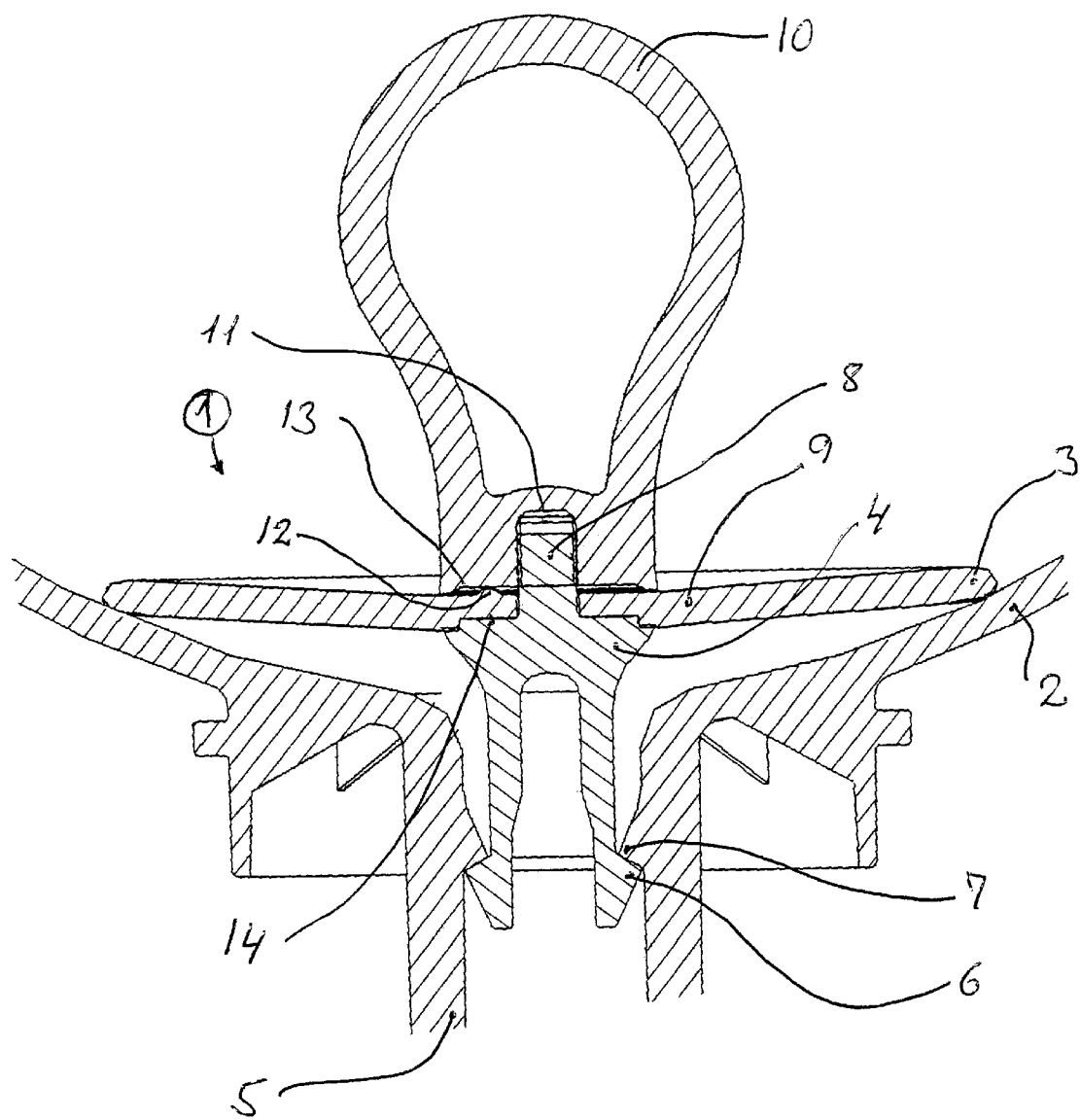

According to the principles of the present invention, this objective is met by a filter (1) equipped with a centrally fitted handle (10), which extends into the funnel (2); where the filter (1) is held in the riser pipe (5) by means of a centrally fitted locking clip (4) with locking devices (6) which fit corresponding locking devices (7) inside the riser pipe (5) at an appropriate distance from the filter (1), and where the handle (10) and locking clip (4) are joined by means of appropriate devices (8) which extend through the filter (1).

21 Claims, 2 Drawing Sheets

FILTER FOR A FUNNEL FOR A COFFEE MAKING APPARATUS

SCOPE OF THE INVENTION

This invention relates to a filter with a fastening device for a coffee-making apparatus of the type where water is brought to a boil in a closed container, whereupon the water is pressed through a riser pipe into a funnel, where boiling water extracts aromas and flavour from the ground coffee, whereupon the finished coffee beverage is filtered back into the closed container through a filter placed at the outlet of the funnel.

STATE OF ART

Such a filter has been known since 1958, where it was made as an accessory to the coffee-making apparatus mentioned above. Parts of this known design is described in DK 90776 and DK 98310.

The filter composition known from this design comprised a plastic plate, the underside of which was equipped with radial projecting grooves, which comprised the filter surface as well as allowed the steam to pass up through the funnel when the water was boiling. By means of the filter surface thus provided, the coffee ground should remain in the funnel; this was only feasible where the coffee had been coarsely ground. Finally, the filter plate was attached by means of a spiral spring running through the riser pipe; this spiral spring had a hook which hooked onto the lower edge of the riser pipe.

However, this design involves a series of drawbacks, insofar at the filter plate will frequently become stuck due to dried-out coffee ground; thus making it impossible to release the filter plate, even though the spiral spring has been released from the lower edge of the riser pipe.

THE OBJECTIVE OF THE INVENTION

Consequently, the basis for this invention is the object of providing a filter for a coffee-making apparatus of the type mentioned in the introduction, where the aroma and flavour of the ground coffee is exploited as well as possible by means of a filter which offers a comparatively large filter surface for the finished coffee, and where the filter can be easily removed from the funnel and cleaned with a view to further coffee-making. Moreover, the filtermust be easily replaceable by dismantling the handle and locking clip and fitting these on a new filter.

According to the principles of the present invention, this objective is met by a filter of the type initially mentioned, where the filter is equipped with a centrally fitted handle, which extends into a funnel; where the filter is held in the riser pipe by means of a centrally fitted locking clip with locking devices which fit corresponding locking devices inside the riser pipe at an appropriate distance from the filter; and where the handle and locking clip are joined by means of appropriate devices which extend through the filter.

With a filter according to the principles of the present invention, the aromas and flavour of the ground coffee can be exploited as well as possible, insofar as the filter offers a large filter surface for the finished coffee in comparison to previous filter types. This means that finely ground coffee can also be used, thus ensuring better utilisation of the aroma and flavour of the coffee. The filter can also be easily removed from the funnel and cleaned with a view to further coffee-making as the handle extends into the funnel, thus making it easy to get a hold of and release from the grip of the locking clip on the locking devices of the riser pipe. Moreover, the filter is easily replaced, as the handle and locking clip can be disassembled and refitted on a new filter.

In an appropriate embodiment, the present invention consists in a manner essentially known of a vitrified surface of glass or a type of plastic with a specific opening. This facilitates a filter surface which, by means of the best filtering possible, ensures a reliable flow during filtering, just as the specific opening features very few deviations from the projected opening. This means that even very finely ground coffee can be filtered with a large degree of certainty that no sediments will appear in the finished coffee beverage. However, the vitrified glass surface is mechanically fragile, and with a view to providing a more durable filter it is proposed that the filter should in a manner essentially known consist of a filter ring made from plastic, with a hub and a number of spokes extending between the hub and the ring; a filter medium is stretched between these parts.

This embodiment of the filter provides a filter which similarly offers optimum filtering, but where the filter is also made from a type of plastic with a lower mass density and a greater ultimate strength in mechanical terms than that of glass. If this type of plastic is further defined as polypropylene (PP), the use of the filter in households gives no cause for concern.

In one embodiment of the invention, the filter medium may consist of a mesh which is stretched over a filter ring with spokes and a hub, ensuring that the mesh is affixed in relation to the funnel. In one embodiment of the invention, the mesh consists of polypropylene (PP) which facilitates optimum joining of the materials by means of welding, thus facilitating reliable fastening of the mesh.

Instead of polypropylene, the mesh may also consist of polyester or polyamide. In connection with the use of other types of plastic, it must, however, be observed that the material must be able to withstand temperatures >100° Celsius without deformation.

Disposable paper filters may also be used as filter medium instead of a mesh.

In one appropriate embodiment of the filter according to the principles of the present invention, the filter circumference on the side facing the funnel is fitted with radial slits. These slits are used for various purposes. During boiling, they serve to distribute the rising steam equally throughout the outer diameter of the entire filter, thus occasioning an optimum mixture of coffee and water while ensuring homogenous temperatures in the funnel.

With a view to ensuring increased stability of the fitted filter, it is proposed that the central area of the filter should be displaced axially towards the outlet of the funnel towards the riser pipe, and that the filter should have centrally positioned devices to achieve correct fitting of handle and locking clip. Increased stability is achieved by making the filter more rigid with respect to mechanical stresses, such as removal and placing of the filter, and by correctly fitting the handle and locking clip, the filter will always be correctly positioned in relation to the radial slits and the mechanical stresses on the filter.

One embodiment in accordance with the principles of the present invention proposes that the locking devices of the locking clip consist of a number of pins, each having a locking hook to catch a corresponding locking protuberance in the riser pipe. Moreover, in an appropriate embodiment it is proposed that the locking hooks (6) and locking protuberances (7) catch each other by means of sloping surfaces. Thus, the filter can be released from the funnel by means of a single radial movement of the handle inside the funnel, thus releasing the locking hooks from their clasp on the locking protuberances in the riser pipe. An alternative embodiment might propose that the locking hooks and locking protuberances be designed as a bayonet joint, but in that case the handle would need to turned, rather than being moved radially. Regardless of the embodiment, it will be advantageous to have the locking clip consist of a type of plastic, which in one advantageous embodiment may be polyoxymethylene (POM).

With a view to correct mounting of handles and locking clip, a particularly advantageous embodiment proposes to have the devices for joining the handle and locking clip consist of a thread and a threaded pin, respectively. It is also proposed that the filter should, in a central position on the side facing the locking clip, have a recess which corresponds to the outline of the locking clip and which serves to centre the locking clip, and that the filter should otherwise be equipped with protrusions ensuring that the filter cannot be placed in a wrong position between the handle and locking clip.

Further advantageous embodiments of the invention will appear from the dependent claims.

SHORT DESCRIPTION OF THE DRAWINGS

Figure 2:
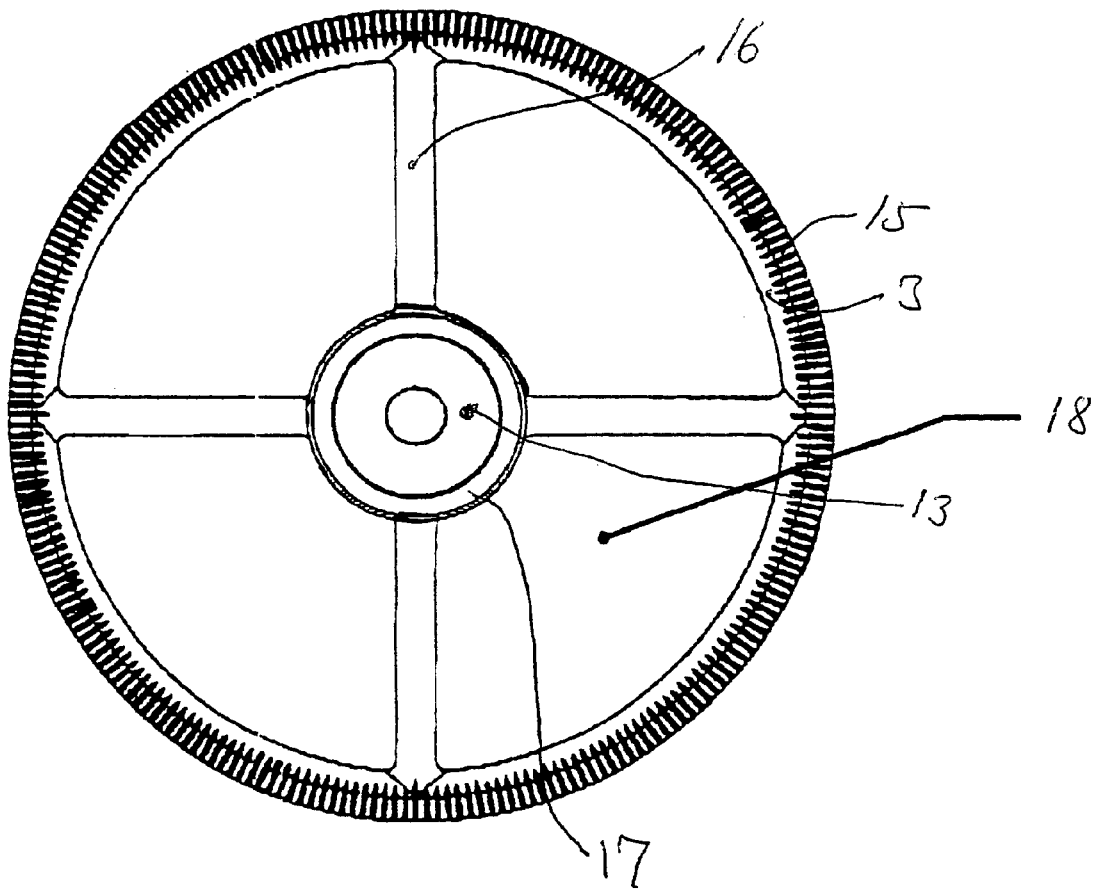

The drawing depicts an example of an embodiment of the present invention. In this drawing:

FIG. 1 depicts an axial cross-section through a filter in accordance with the principles of the present invention mounted over the outlet of the funnel, and FIG. 2 depicts a filter in accordance with the principles of the present invention seen from the side facing the funnel.

In FIG. 1, the filter 1 is shown when mounted in the funnel 2 of a coffee-making apparatus which shall not be specified in more detail. The circumference 3 of the filter 1 rests on the bottom of the funnel 2 and, by means of the locking clip 4, reaches down into the riser pipe 5, where the locking hooks 6 hook onto the locking protuberances 7 in the riser pipe 5. In the embodiment shown here, a threaded pin 8 stretches axially from the locking clip 4 up through the central part 9 of the filter 1 to the axial thread 11 of the handle 10, where the handle 10 and locking clip 4 can be joined by screwing them together.

On the side facing the opening of the funnel of the central part 9 of the filter 1, it is possible to make out a protuberance 12, which fits a corresponding recess (not shown) in the underside of the handle 10.

On the side of the central part 9 of the filter 1 which faces the riser pipe 5, it is possible to make out a recess 13 which fits a corresponding protuberance 14 on the locking clip 4.

It may be advantageous in terms of safety to have the locking hooks 6 and locking protuberances 7 hook onto each other by means of sloping surfaces, as this would make it possible for the filter to release itself in the event of an uncontrollable rise in the overpressure of the closed container, thus avoiding an explosion.

FIG. 2 depicts the side of the filter 1 facing the riser pipe 5. In this embodiment of the present invention, this side of the filter 1 consists of a mesh stretched over a filter ring 3 (made from plastic) with a hub 17 and a number of spokes 16 stretching between hub and ring. This ensures that the mesh is fixed in relation to the funnel. In one embodiment of the invention, the mesh consists of polypropylene (PP) which facilitates optimum joining of the materials by means of welding, thus facilitating reliable fastening of the mesh.

The radial slits 15 can be seen on the filter circumference 3; these slits 15 serve various purposes. During boiling, the slits 15 serve to distribute the rising steam equally throughout the outer diameter of the entire filter, thus occasioning an optimum mixture of coffee and water while ensuring homogenous temperatures in the funnel. During filtering, the slits 15 assist in the filtering of the finished coffee on equal footing with the other filter material.

The embodiment shown is an example only and is not limited to that which is depicted in the drawings. Changes and variations which are obvious to experts are also included in the scope of this invention.

What is claimed is:

1. A filter with a fastening device for a coffee-making apparatus of the type where water is brought to a boil in a closed container, whereupon the water is pressed through a riser pipe into a funnel, where boiling water extracts aromas and flavour from ground coffee, whereupon a finished coffee beverage is filtered back into the closed container through a filter placed at an outlet of the funnel, where the filter is fastened by means of a fastening device which reaches into the riser pipe, characterised in that:

the filter has a centrally fitted handle that extends up into the funnel;

the filter is held in the riser pipe by a centrally fitted locking clip having a number of pins, each pin having a locking hook that engages a corresponding locking protuberance in the riser pipe at an appropriate distance from the filter; and the handle and locking clip are joined by means of appropriate devices which extend through the filter.

2. Filter according to claim 1, characterised in that the filter comprises vitrified glass or a similar material with a specific opening.

3. Filter according to claim 1, characterised in that the filter comprises a filter ring with a hub and a number of spokes extending between the hub and the ring;

wherein a filter medium is stretched between the ring, the spokes and the hub.

4. Filter according to claim 1, characterised in that the filter ring is made of polypropylene (PP).

5. Filter according to claim 1, characterised in that a circumference of the filter on a side facing the funnel is fitted with radial slits.

6. Filter according to claim 1, characterised in that the filter has centrally positioned devices to ensure that the handle and locking clip are correctly mounted.

7. Filter according to claim 1, characterised in that a central part of the filter is displaced axially towards the outlet of the funnel to the riser pipe.

8. Filter according to claim 1, characterised in that the locking hook of each pin of the locking clip and the corresponding locking protuberance catch each other by means of sloping surfaces.

9. Filter according to claim 1, characterised in that the locking clip is made from a type of plastic.

10. Filter according to claim 9, characterised in that the type of plastic used in polyoxymethylene (POM).

11. Filter according to claim 1, characterised in that the handle is screwed to the locking clip by an internal thread carried by one of the handle and the locking clip and a threaded pin carried by another of the handle and the locking clip.

12. A filter with a fastening device for a coffee-making apparatus of the type where water is brought to a boil in a closed container, whereupon the water is pressed through a riser pipe into a funnel, where boiling water extracts aromas and flavour from ground coffee, whereupon a finished coffee beverage is filtered back into the closed container through a filter placed at an outlet of the funnel, where the filter is fastened by means of a fastening device which reaches into the riser pipe, characterised in that:

the filter has a centrally fitted handle that extends up into the funnel;

the filter is held in the riser pipe by a centrally fitted locking clip having a bayonet joint comprising a locking protuberance and a locking hook that engages in the riser pipe at an appropriate distance from the filter; and the handle and locking clip are joined by means of appropriate devices which extend through the filter.

13. Filter according to claim 12, characterised in that the filter comprises vitrified glass or a similar material with a specific opening.

14. Filter according to claim 12, characterised in that the filter comprises a filter ring with a hub and a number of spokes extending between the hub and the ring;

wherein a filter medium is stretched between the ring, the spokes and the hub.

15. Filter according to claim 14, characterised in that the filter ring is made of polypropylene (PP).

16. Filter according to claim 12, characterised in that a circumference of the filter on a side facing the funnel is fitted with radial slits.

17. Filter according to claim 12, characterised in that the filter has centrally positioned devices to ensure that the handle and locking clip are correctly mounted.

18. Filter according to claim 12, characterised in that a central part of the filter is displaced axially towards the outlet of the funnel to the riser pipe.

19. Filter according to claim 12, characterised in that the locking clip is made from a type of plastic.

20. Filter according to claim 19, characterised in that the type of plastic used is polyoxymethylene (POM).

21. Filter according to claim 12, characterised in that the handle is screwed to the locking clip by an internal thread carried by one of the handle and the locking clip and a threaded pin carried by another of the handle and the locking clip.

* * * * *